United States Patent Office 3,328,452
Patented June 27, 1967

3,328,452
THIOSULFOALKANOATE COMPOUNDS
William B. Dickinson, Loudonville, N.Y., assignor to Sterling Drug Inc., New York, N.Y., a corporation of Delaware
No Drawing. Filed Aug. 27, 1965, Ser. No. 483,361
3 Claims. (Cl. 260—453)

This invention relates to chemical compositions of matter classified as thiosulfoalkanoates.

The novel chemical compounds of the invention are S-2-carboxyethyl 3-thiosulfopropionate and S-3-carboxypropyl 4-thiosulfobutyrate which can be represented by the structural formula

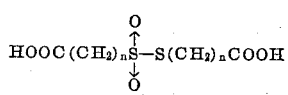

where n represents 2 and 3 respectively. Alternatively the compounds can be named 3,3'-dithiodipropionic acid S,S-dioxide and 4,4'-dithiodibutyric acid S,S-dioxide.

The compounds have valuable properties as inhibitors of the enzyme urease which hydrolyzes urea to ammonia and carbon dioxide, and thus are useful for the control of ammonia production and for the improvement of feed utilization in domestic animal rations.

The new compounds of the invention are obtained in one method by the oxidation of 3-mercaptopropionic acid or 4-mercaptobutyric acid with aqueous hydrogen peroxide in an acidic medium at 30–50° C. or with a per acid as for example, peracetic or perbenzoic acid in an inert solvent, for example chloroform, ethyl acetate, etc., at temperatures between 0° C. and 40° C. In a second method for the preparation of the compounds the corresponding dithiodialkanoic acids are oxidized with hydrogen peroxide in an acidic medium or a peracid in an inert solvent at temperatures between 30° C. and 50° C. In the preferred method the appropriate mercaptoalkanoic acid is dissolved in glacial acetic acid and oxidized with aqueous hydrogen peroxide at a temperature between 35–40° C. Use of substantially higher temperatures results in markedly decreased yields and contamination with products at higher stages of oxidation.

The invention is illustrated by the following examples without, however, being limited thereto.

EXAMPLE 1
*S-2-carboxyethyl 3-thiosulfopropionate*

To a solution of 530 g. of 3-mercaptopropionic acid in 500 ml. of glacial acetic acid was added dropwise 1020 ml. of 30% aqueous hydrogen peroxide. The addition required four hours, during which time the temperature of the reaction mixture was kept below 40° C. by occasional use of a cooling bath. After the addition was completed the mixture was stirred for three hours at 35–38° C. then left overnight in the refrigerator. The solid which separated was collected by filtration, taken up in 600 ml. of water and the slurry made basic with 120 g. of sodium carbonate. The resultant solution was filtered, the filtrate acidified with 205 ml. of concentrated hydrochloric acid in 400 ml. of water and the mixture refrigerated. The solid which separated was collected by filtration and dried in a vacuum oven at 60° C. Several recrystallizations from water gave 339 g. of S-2-carboxyethyl 3-thiosulfopropionate having the molecular formula $C_6H_{10}O_6S_2$ and melting at 146–147° C. with decomposition.

EXAMPLE 2
*S-3-carboxypropyl 4-thiosulfobutyrate*

To a suspension of 23.8 g. of 4,4'-dithiodibutyric acid in 50 ml. of glacial acetic acid was added dropwise 25 ml. of 30% aqueous hydrogen peroxide. The temperature of the reaction mixture was kept between 37° C. and 41° C. during the one and one-half hours required for the addition. After the addition was complete the temperature was held at 41–43° C. for three hours. The reaction mixture was cooled and then left standing overnight. The acetic acid was removed by vacuum distillation and the wax-like white solid residue slurried in 50 ml. of ether and then recovered by filtration. Recrystallization from 1,750 ml. of ether followed by drying at 40° C. in vacuo gave 6.2 g. of S-3-carboxypropyl 4-thiosulfobutyrate having the molecular formula $C_{18}H_{14}O_6S_2$ and melting at 97–103° C.

The S-2-carboxyethyl 3-thiosulfopropionate and S-3-carboxypropyl 4-thiosulfobutyrate react with inorganic and organic bases to form the corresponding mono- or di-salts, depending on whether one or two equivalents of base are employed and are the full equivalent of the subject matter specifically claimed. The water-soluble alkali metal salts and the ammonium salts are especially useful and economical forms for many purposes, but other salts are also readily obtained and may be preferred in some instances, for example: the alkaline earth metal salts, for instance the calcium, magnesium and barium salts; the copper, mercury and arsenic salts; and substituted ammonium salts, for instance the dimethylammonium and triethanolammonium salts.

The structural formulas assigned to the products of the invention are in full conformance with the modes of synthesis employed in obtaining them and with the results of elementary and spectral analyses of the products.

The above compounds inhibit urease in vitro. The inhibition can be readily determined by means of standard biological test procedures. For instance, the following method is used. One ml. of a urease solution containing 1.5 mg. of crystalline jack bean urease is pipetted into a prewarmed test tube. One ml. of water, in the case of control determinations, or a 1 ml. aqueous solution of test agent is added to the urease solution, mixed and allowed to preincubate for five minutes. Reaction is initiated by rapid addition of 1 ml. of urea-phosphate solution to the enzyme-test agent mixture. The ureaphosphate solution consists of 3% urea containing 9.6% phosphate buffered at a final pH of 7.0. After five minutes of reaction time, 1 ml. of 1/1 (v./v.) sulfuric acid is added. The contents of the test tubes are rinsed thoroughly into 200 ml. volumetric flasks, filled to within 50 ml. of the mark and 10 ml. of 10% sodium hydroxide added. The ammonia released by urease action is developed colorimetrically by the rapid addition of 15 ml. of Nessler's reagent. The flasks are made up to 200 ml. with water and read after fifteen minutes in an Evelyn colorimeter at 520 m$\mu$. The ammonia produced by urease is compared with controls on a Standard curve of optical density vs. mg. of ammonia nitrogen. Thus using this procedure S-2-carboxyethyl 3-thiosulfopropionate inhibited urease by 50% at $4.3 \times 10^{-4}$ M and S-3-carboxypropyl 4-thiosulfobutyrate at $3.5 \times 10^{-3}$ M. In contrast the known 2,2-dithiodipropionic acid and S-carboxymethyl thiosulfinoacetate gave 4% inhibition at $1 \times 10^{-3}$ M and $5 \times 10^{-3}$ M respectively.

The new compounds can be employed to increase feed utilization in animal rations by conventional methods, for instance, by incorporation in bulk feeds at levels of 5–100 g. per ton.

I claim:
1. A compound of the formula

$$HOOC(CH_2)_n\overset{O}{\underset{O}{\overset{\uparrow}{\underset{\downarrow}{S}}}}-S(CH_2)_nCOOH$$

where $n$ is 2 or 3.

2. S-2-carboxyethyl 3-thiosulfopropionate.
3. S-3-carboxypropyl 4-thiosulfobutyrate.

No references cited.

CHARLES B. PARKER, *Primary Examiner.*
JOSEPH P. BRUST, *Examiner.*